United States Patent [19]

Noda

[11] Patent Number: 5,383,547

[45] Date of Patent: Jan. 24, 1995

[54] SCRAPER CONVEYOR

[76] Inventor: Seiichi Noda, He 54, Aza Kizu, Nanatsuka-machi, Kahoku-gun, Ishikawa-ken, Japan

[21] Appl. No.: 116,694

[22] Filed: Sep. 7, 1993

[30] Foreign Application Priority Data

Sep. 8, 1992 [JP] Japan .................. 4-265355

[51] Int. Cl.6 .............................................. B65G 19/00
[52] U.S. Cl. ...................................... 198/728; 198/716
[58] Field of Search ............... 198/716, 717, 723, 725, 198/727, 728

[56] References Cited

U.S. PATENT DOCUMENTS

| | | | |
|---|---|---|---|
| 1,268,663 | 6/1918 | Alvey | 198/728 X |
| 1,447,423 | 3/1923 | Mascord | 198/728 |
| 1,740,921 | 12/1929 | Gotthardt | 198/728 X |
| 1,995,589 | 3/1935 | Sinden | 198/716 X |
| 2,089,738 | 8/1937 | Elmer | 198/716 X |
| 3,303,920 | 2/1967 | Clyne | 198/728 X |
| 3,561,907 | 2/1971 | Campbell | 198/716 X |
| 4,008,975 | 2/1977 | Cutler | 198/727 X |
| 4,946,026 | 8/1990 | Rickman | 198/716 X |

Primary Examiner—James R. Bidwell
Attorney, Agent, or Firm—Browdy and Neimark

[57] ABSTRACT

A scraper conveyor has a machine frame consisting of a horizontal grains supply case, a horizontal discharge case placed at a position higher than the supply case and having a discharge port, and a slanted case arranged between both these cases; a pair of sprockets arranged at both the ends of the machine frame; an endless chain provided with a number of paired scrapers for conveying grains and extending around the sprockets; a curved guide rail extending along substantially the whole length of the machine frame and being arranged in the frame in order to support upward the upper returning chain portion of the chain; a pair of chain sustaining members for preventing the upper returning chain portion and lower advancing chain portion of the chain from floating; and chain support members for supporting upward the lower advancing chain portion.

3 Claims, 5 Drawing Sheets

SCRAPER CONVEYOR

INDUSTRIAL FIELD OF THE INVENTION

The present invention relates to a scraper conveyor for conveying rice, wheat, barley and the like to elevated places.

PRIOR ART

Conventionally, such scraper conveyors have been known which respectively have a straight machine frame and an endless chain provided with a plurality of scrapers attached thereto.

According to the known scraper conveyor having the straight machine frame, the machine frame must be so positioned as to be slanted relative to a floor B as shown in FIG. 9 in order to transfer such grain to a tall reservoir or corn reserve. Two problems are occurred when the machine frame A is slanted. The one is that some grain is stayed or stored at a bottom portion D positioned at a level of the machine frame lower than that of the supply port C and they cannot conveyed. The other is that an outlet port G of the machine frame A is difficult to place at a suitable position to a hopper H of the reserve or tank E because that a corner portion F of the corn reserve E protrudes.

OBJECTS OF THE INVENTION

Consequently, it is the first purpose of the present invention to provide a scraper conveyor having a machine frame provided with a pair of horizontal end portions and a slanted mid portion.

In addition, it is the second purpose of the present invention to provide a scraper conveyor having a machine frame curved at its mid portion, which however can enjoy a minimum decrease of its conveying performance.

It is the third purpose of the present invention to provide a scraper conveyor having a machine frame curved at its mid portion, which however can substantially minimize or restrict breaking of grains.

PREFERRED EMBODIMENTS OF THE INVENTION

Figure 1:
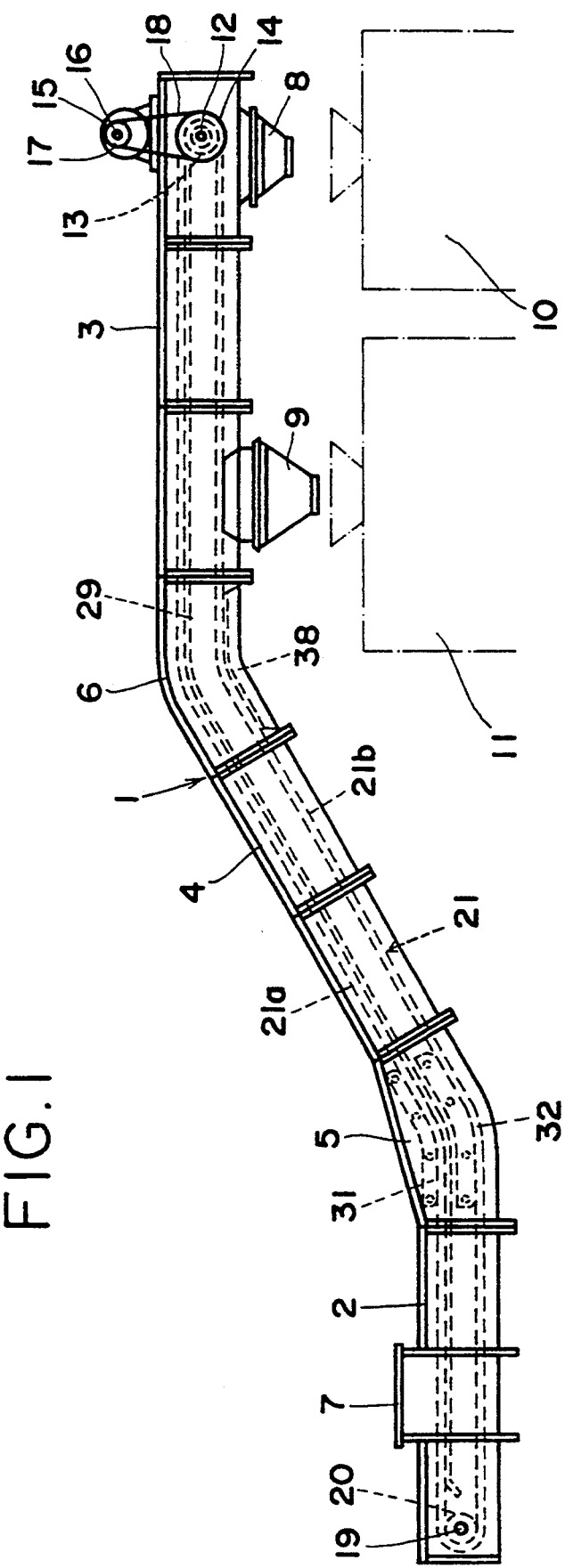
FIG. 1 is a side elevation of the scraper conveyor according to the present invention.

As shown clearly, the machine frame 1 of the chain conveyor comprises a horizontally-arranged supply case 2 placed at a low position, a horizontally-arranged discharge case 3 placed at a high position, and a slanted case 4 placed between these cases 2 and 3. The supply case 2 and the slanted case 4 are connected to each other by an arc-like lower corner member 5, and the discharge case 3 and the slanted case 4 are connected through an arc-like upper corner member 6. A supply port 7 is formed on the upper face of the supply case 2 and one or more than one of discharge ports 8 and 9 are provided on the lower face of the discharge case 3. For example, grain reserves 10 and 11 placed below the discharge ports 8 and 9.

A drive sprocket 13 secured to a drive shaft 12 is placed in an end portion of the discharge case 3. An end portion of the drive shaft 12 protrudes sidewardly through the discharge case 3. A large diameter sprocket 14 is secured to the protruded portion of the drive shaft 12. A motor 15 is attached to an upper face of the case 3, a small diameter sprocket 17 is attached to an output shaft 16 of the motor 15, and the small diameter sprocket 17 and the large diameter sprocket 14 are connected by a chain 18.

In the end portion of the supply case 2, a follower sprocket 20 is rotatably supported by a rotary shaft 19. Around the peripheries of the drive sprocket 13 and the follower sprocket 20, an endless chain 21 extends.

Figure 3:
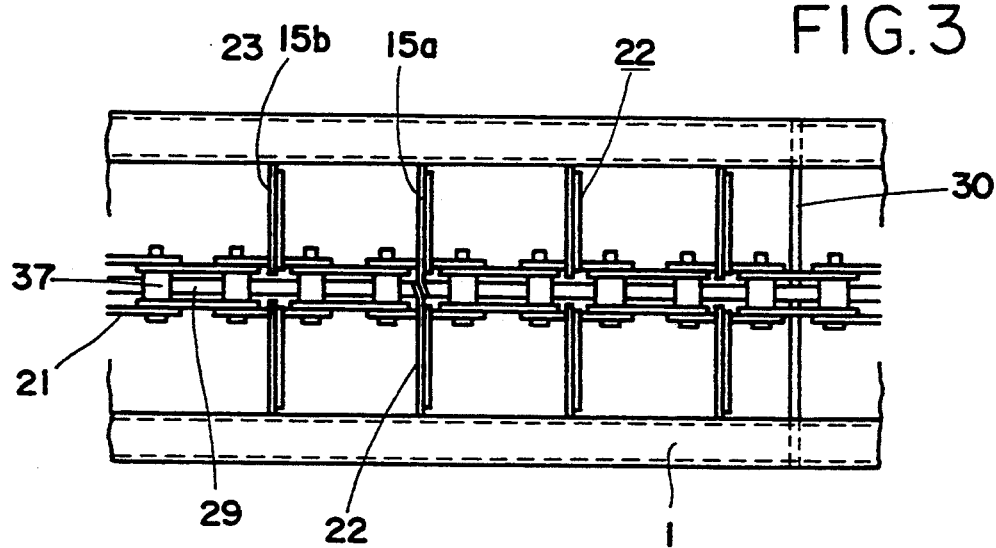
FIG. 3 is a plan view of the scraper conveyor.
Figure 5:
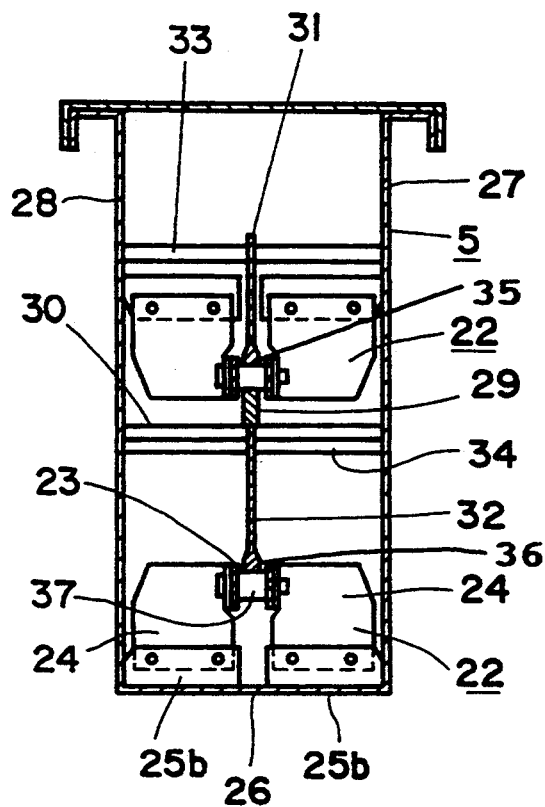
FIG. 5 is a section taken along line V—V of FIG. 2.
Figure 6:
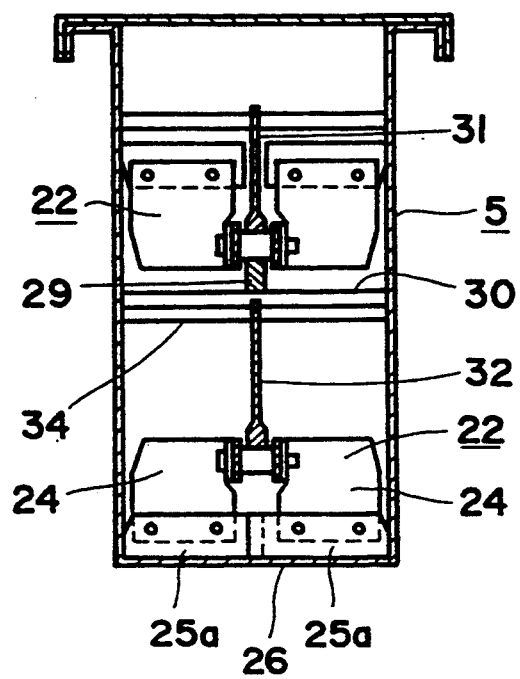
FIG. 6 is a section taken along line VI—VI of FIG. 2.

As shown in FIGS. 3, 5 and 6 plurality of left and right paired scrapers 22 are secured to the endless chain 21. Each scraper 22 consists of a hard plate 24 made of material of sufficient strength and of about a right square, which is secured to each outer link 23 of the chain 21, and a plate 25a or a plate 25b made of material of sufficient elasticity and secured to a lower end of the hard plate 24 by screws and the like. Elastic plate 25a or 25b are different sizes and either elastic plate 25a and 25b used to the pair of the scrapers 22. When large elastic plates 25a are used to make the pairs of scrapers 22 as shown in FIG. 3 and FIG. 6, parts of the elastic plates 25a are overlapped and contacted with the bottom plate 26 and both the side plates 27, 28 of the machine frame 1 without any gap between them. When small elastic plates 25b are used to make the scrapers 22 as shown in FIG. 5, these small plates 25b comes intimately contact with both the side plates 27, 28 without any gap, and comes contact with the bottom plate 26 leaving part of the bottom plate open.

Figure 2:
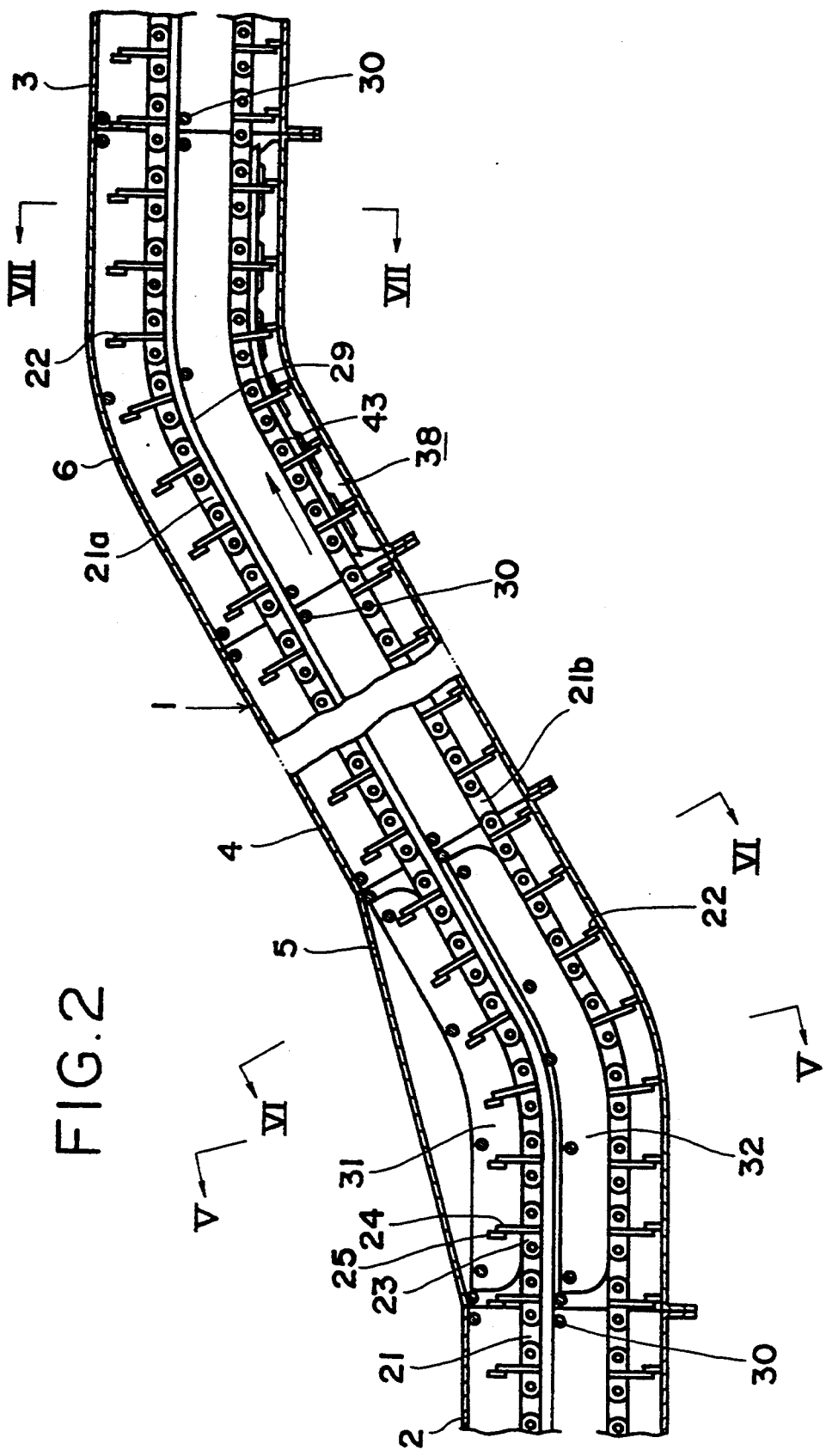
FIG. 2 is a partly-broken enlarged section of the scraper conveyor.

As best shown in FIG. 2, a guide rail 29 supporting an upper returning chain portion 21a moving to the left is attached to the machine frame 1 by a number of support rods 30. The shape of the guide rail 29 is substantially identical with that of the machine frame 1 in their side elevation. The guide rail 29 extends between the sprockets 13 and 20.

As shown in FIGS. 2 and 5, an upper chain sustainer 31 and a lower chain sustainer or sustaining member 32 are attached to a lower corner member 5. Respective chain sustainers 31 and 32 are secured to both the side plates 27 and 28 of the lower corner member 5 by means of support rods 33 and 34. Respective chain sustainers 31 and 32 have lower faces 35 and 36 which engage rollers 37 of the endless chain 21 and are curved in the same manner as bottom side 26 of lower corner member 5.

Figure 4:
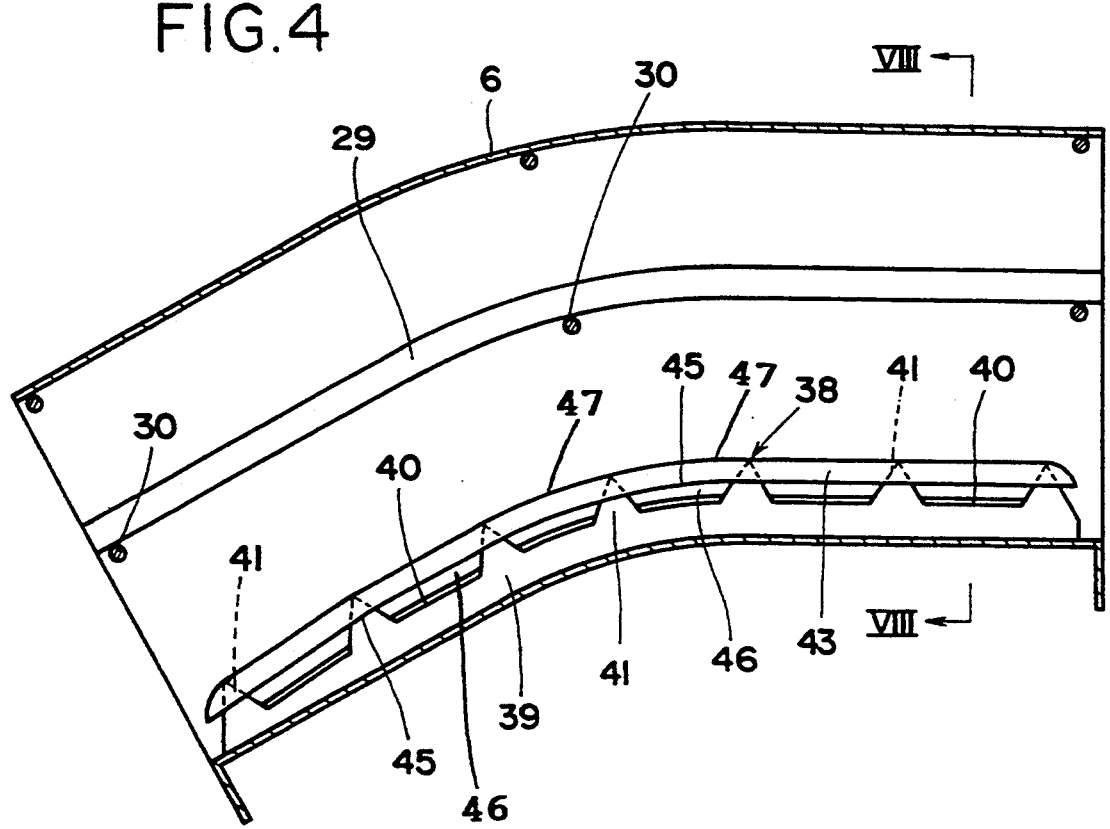
FIG. 4 is a section of an upper corner member.
Figure 7:
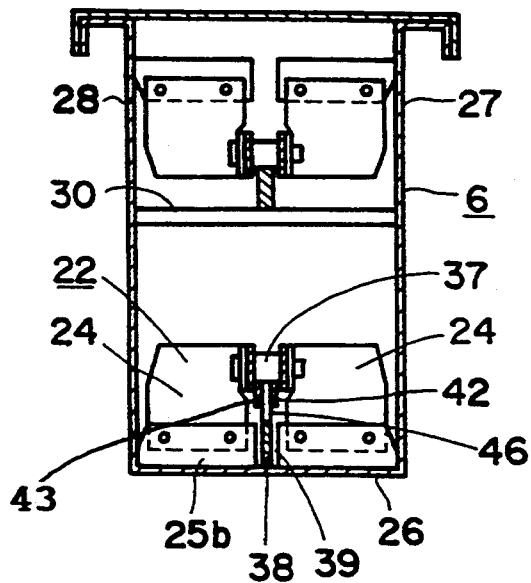
FIG. 7 is a section taken along line VII—VII of FIG. 2.
Figure 8:
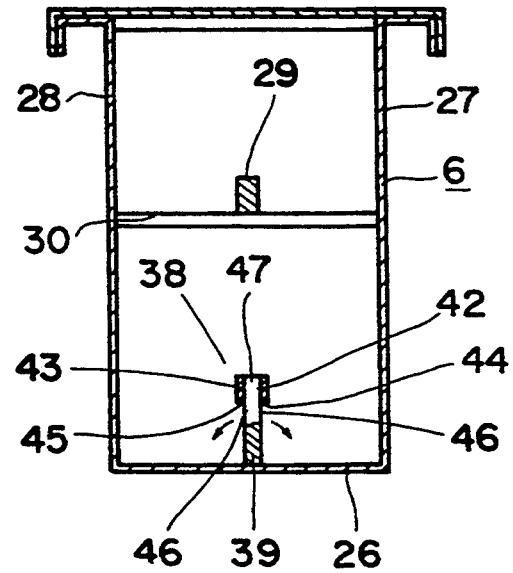
FIG. 8 is a section taken along line VIII—VIII of FIG. 4.
Figure 9:
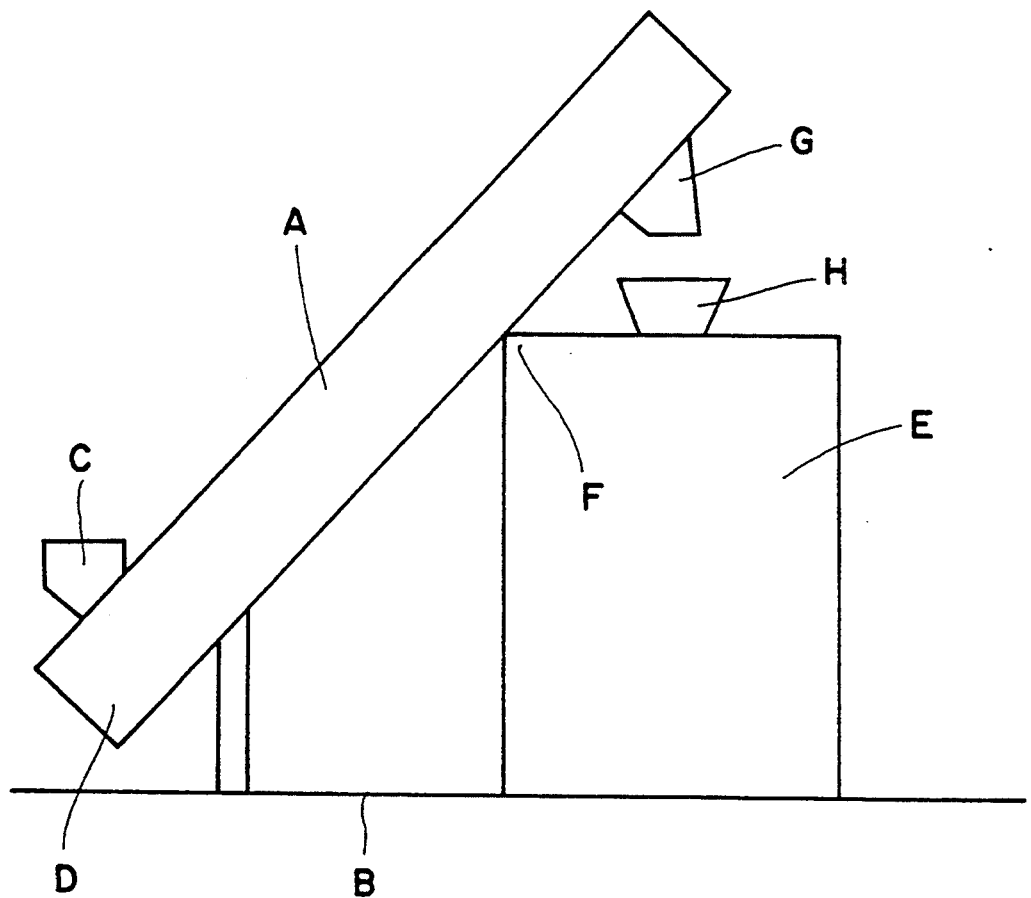
FIG. 9 is a view of the known scraper conveyor.

As shown in FIG. 4 and FIG. 7, a chain supporter or supporting member 38 is secured to the bottom plate 26 of the upper corner member 6. A plurality of triangle shape protrusions 41 are placed at a regular interval on an upper edge 40 of a base plate 39 of the chain supporter 38. A pair of support rails 42 and 43 along which the rollers 37 of the chain 21 slide are secured to both the sides of the protrusion 41. Between the support rails 42 and 43, a gap 47 identical to the width of the protrusion 41 is formed. As shown on FIG. 4, the length of each gap 47 is equal to the distance between adjacent protrusions 41. The upper edge 40 of the base plate 39 has a raised surface, and a gap 46 communicated with the gap 47 is formed between the lower edges 44, 45 and the upper edge 40 of the support rails 42 and 43. Widths of the gaps 46 and 47 are larger than grain size to be conveyed by the scraper conveyor of the present invention.

Operation of the scraper conveyor will be described.

When the motor 15 rotates the drive shaft 12 through a transmission, the drive sprocket 13 secured to the drive shaft 12 moves the upper returning chain portion 21a to the supply side of the machine frame along the guide rail 29 extending between both the sprockets 13 and 20. At this time, a lower advance chain 21b moves to the discharge side of the machine frame while the scraper 22 sliding along the bottom plate 26 of the machine frame 1.

In order to convey grain to the grain reserve 10 while the chain 21 moves in the machine frame described above, first open a shutter of the particular discharge port 8 and second charge grain to the supply port 7. Then, grain accumulated on the bottom plate 26 sequentially conveyed to the discharge port 8 by means of the scrapers 22 and dropped onto the hopper of the corn reserve 10 through the open discharge port 8.

While the working above of the scraper conveyor, part the chain 21b in the lower corner member 5 is pressed downward by the chain sustaining member 32, and another part of the chain 21b in the upper corner member 6 is supported upward by the chain support member 38, so that, notwithstanding that the machine frame 1 is curved, respective scrapers 22 of the lower advancing chain portion 21b slide with equal pressure along the bottom plate 26 of the machine frame 1 resulting in an effective conveying of grain.

The grains sandwiched between the chain portion 21b and the chain support member 38 drops to the lower gap 46 through a gap 47 between the support rails 42 and 43, as a result it is possible to drastically decrease chance of breakage of grains by the chain portion 21b and the chain support member 38.

In addition, some pairs of the scrapers 22 attached to the chain 21, respectively are made of large elastic plates 25a and 25a which intimately contact with the bottom plate 26 and both the side plates 27, 28 of the machine frame 1 without any gap, so that it is possible to firmly convey all grains without remaining grains when a few grains are placed in the machine frame 1. As a result, no grain is remained in the machine frame 1 after the scrapers 22 pass there.

What is claimed is:

1. A scraper conveyor comprising:
    a curved machine frame having 1) a machine frame having a horizontal supply case provided with a supply port, 2) a horizontal discharge case placed at a position higher than the supply case and provided with a discharge port, and 3) a slanted case placed between said horizontal supply case and horizontal discharge case;
    a drive sprocket so placed at an end of the discharge case as to rotate by a motor;
    a follower sprocket placed at an end of the supply case;
    an endless chain extending around both the sprockets, said endless chain having a plurality of paired scrapers for conveying grain;
    a guide rail formed along substantially an entire length of the curved machine frame and arranged in the machine frame in order to support upward an upper return chain portion of the endless chain;
    a pair of chain sustain members arranged at a first corner portion between the supply case and the slanted case to prevent the upper return chain portion and a lower advancing chain portion of said endless chain from floating; and
    a chain support member arranged at a second corner portion between the discharge case and the slanted case to support upward the lower advancing chain portion
    wherein said chain support member has a pair of support rails to engage rollers on the lower advancing chain portion, the support rails having a gap between the rails, dimensioned to permit only grain to pass through.

2. The scraper conveyor according to claim 1, wherein said chain support member has a base plate secured to a bottom plate of the machine frame and a pair of support rails secured to an upper edge of said base plate and along which rollers of the lower advancing chain portion are engaged, said support rails having a first gap between the rails dimensioned to permit only grain to pass through, and a second gap formed between a top edge of the base plate and lower edges of the support rails, said second gap communicating with said first gap.

3. The scraper conveyor according to claim 2, wherein said top edge has a triangular protrusion fixed between and supporting the pair of rails.

* * * * *